United States Patent
Choi et al.

(10) Patent No.: US 7,447,329 B2
(45) Date of Patent: Nov. 4, 2008

(54) APPARATUS AND METHOD FOR PRODUCING A DOCUMENT VERIFIABLE FOR ITS FORGERY OR ALTERATION, AND APPARATUS AND METHOD FOR AUTHENTICATING THE DOCUMENT

(75) Inventors: Jong-Uk Choi, Seoul (KR); Jong-Won Kim, Taejeon (KR)

(73) Assignee: Markany Inc., Seoul (KR)

( * ) Notice: Subject to any disclaimer, the term of this patent is extended or adjusted under 35 U.S.C. 154(b) by 692 days.

(21) Appl. No.: 10/356,298

(22) Filed: Jan. 30, 2003

(65) Prior Publication Data
US 2003/0147549 A1   Aug. 7, 2003

(30) Foreign Application Priority Data
Feb. 1, 2002   (KR) .................. 10-2002-0005943

(51) Int. Cl.
G06K 9/00 (2006.01)
G06K 7/10 (2006.01)
B42D 15/00 (2006.01)
H04L 9/00 (2006.01)

(52) U.S. Cl. .................. 382/100; 235/462.01; 283/113; 713/176

(58) Field of Classification Search .................. 382/100; 283/113; 235/462.01–462.09; 713/716, 713/176
See application file for complete search history.

(56) References Cited
U.S. PATENT DOCUMENTS 6,356,923 B1 * 3/2002 Yano et al. .................. 717/127
6,892,947 B1 * 5/2005 Jam et al. ............... 235/462.01
7,007,303 B2 * 2/2006 Goldberg et al. .............. 726/26
7,043,052 B2 * 5/2006 Rhoads ........................ 382/100
7,152,786 B2 * 12/2006 Brundage et al. ........... 235/380
2001/0037455 A1 * 11/2001 Lawandy et al. ............ 713/176
2002/0054317 A1 * 5/2002 Matsunoshita et al. ..... 358/1.14
2003/0141375 A1 * 7/2003 Lawandy ..................... 235/494

* cited by examiner

Primary Examiner—Bhavesh Mehta
Assistant Examiner—Manav Seth
(74) Attorney, Agent, or Firm—Fulbright & Jaworski LLP

(57) ABSTRACT

The present invention relates to apparatus and method for producing a document verifiable for its forgery or alteration, and apparatus and method for authenticating the document. A barcode is generated based on the information included in the document, and also watermark is generated based on the information included in the document. The generated barcode and watermark are combined, and the combined barcode and watermark are inserted in the document so as to produce the document. When authenticating the document, the document is detected so as to extract the barcode inserted in the document and the information included in the extracted barcode and the information included in the document are compared, and also the document is detected so as to extract the watermark inserted in the document and the information included in the extracted watermark and the information included in the document are compared. According to the present invention, it is possible to prevent forgery or alteration of the document produced on-line and off-line when such document is distributed on-line or off-line. It is also possible to verify whether the document has been forged or altered, and also to verify the forgery or alteration of the barcode itself.

15 Claims, 4 Drawing Sheets

APPARATUS AND METHOD FOR PRODUCING A DOCUMENT VERIFIABLE FOR ITS FORGERY OR ALTERATION, AND APPARATUS AND METHOD FOR AUTHENTICATING THE DOCUMENT

FIELD OF THE INVENTION

The present invention relates to apparatus and method for producing a document verifiable for its forgery or alteration, and apparatus and method for authenticating the document.

More specifically, the present invention relates apparatus and method for preventing forgery or alteration committed on-line or off-line on various documents such as official document used in a government office, a personal correspondence document used for private matters between individuals, commercial correspondence document between individuals or between companies for profit purposes and bill used as a certain type of card for enhancing efficiency of business practice, and relates to apparatus and method for producing safe document which can be safely distributed and delivered, and relates to apparatus and method for authenticating such document.

According to the present invention, watermark and barcode are generated by using information within the document, and the generated watermark and barcode are inserted in the document in accordance with a specific method so as to produce document. The inserted watermark and barcode are extracted, and the document is authenticated from the comparison between such extracted watermark and barcode to the document information.

BACKGROUND OF THE INVENTION

Recently, together with a rapid advance of computer and internet technology, a large number of digital works are produced and distributed. In this regard, copies or modified ones of such digital works identical to the original works can be easily made without authorization from the author. Accordingly, techniques for preventing illegal copying of the digital works and the distribution thereof are being attempted in various manners.

A watermarking technique, one of the above techniques, is a technique which inserts information identifiable only by author into the various digital works such as image, audio, video, etc. so as to extract the author information hidden in the digital works for determining the authenticity of such digital works when such digital works are used or distributed without permission of the author. In case of confirming the original owner such as in ownership conflict, etc. in the stage of circulation of digital works, i.e. digital contents, such technique allows the extraction of watermark inserted in the digital contents so as to arrange basis for enforcing rights such as the ownership, copyright, etc.

The conventional watermarking technique provides an advantage of protecting the copyright information while concealing and inserting the information with regard to the contents in order for users to be unaware of such inserted information. However, such technique has a drawback of the amount of information which can be inserted is not as much as desired.

Further, barcode commonly used in every field of industries nowadays was originally invented for the purpose of increasing the management efficiency of the supermarkets, reducing the time spent waiting at the counter, and automatically making a new record of inventories concurrently with the sales. As the barcode showed a big success in its application in the field of retails, other fields of industries began to adopt barcode gradually.

Barcode is classified into continuous type and discrete type in terms of the method of expressing the symbols thereof. The discrete type barcode has each of its characters independently separated, has gap between these characters, and refers to a barcode symbology in which each character starts with a bar and ends with the bar. When such type of barcode is decrypted, the decrypting process is carried out by each character. The continuous type barcode, unlike the discrete type symbology, does not have gap between each character, and refers to a barcode symbology in which each character starts with a bar and ends with space. The end of the character of the continuous type barcode is distinguished by the beginning character of the next character.

Also, barcode is classified into one-dimensional (linear) barcode and two-dimensional barcode in terms of the method of arranging the data. The two-dimensional barcode may be further classified into multiple layer type, matrix type, circular type, hexagonal type, color barcode type, etc. in terms of the shape and arrangement of the bar.

Such conventional barcode is a widely used in every field of industries, which provides an advantage of inserting symbols by using simple symbol structure so as to increase management efficiency, and to easily obtain information with respect to the products. However, such barcode has a drawback as it is difficult to verify whether the barcode has been forged or altered because the barcode is exposed visually and it uses a method of either being attached to the products or printed on the products.

Moreover, as the scope of using barcode is gradually expanding, barcode is used for classifying important document used in the government and public offices or products requiring safety or security such as nuclear wastes as well as the conventional products. Therefore, forgery or alteration of the barcode may bring serious problems according to the expansion of scope of use of barcode. This is because only a simple replacement with other barcode can result in a forgery of the content of the barcode.

SUMMARY OF THE INVENTION

The present invention is to simultaneously solve each of its own peculiar problems rendered by watermarking technique and barcode technique, respectively.

The object of the present invention is to use watermarking technique together with barcode technique so as to prevent or determine forgery or alteration of document produced on-line when it is distributed on-line.

The other object of the present invention is to prevent or determine forgery or alteration of the document produced on-line when it is printed out off-line.

Another object of the present invention is to digitalize off-line document and convert it into electronic document and to insert watermark and barcode together therein so as to prevent or determine forgery or alteration of the document when the document is distributed on-line and off-line.

Still another object of the present invention is to determine forgery or alteration of barcode itself which is inserted in the document as well as the forgery or alteration of document itself.

According to one aspect of the present invention, the present invention provides a method for producing a document verifiable for its forgery or alteration, the method comprising: (a) generating a barcode based on the information which is included in an on-line document in the form of digital file; (b) generating watermark based on the information which is included in the document; (c) combining the generated barcode and watermark; and (d) inserting the combined barcode and watermark into the document.

In this regard, it is preferable that the method further comprises, before said step (a), (a') converting an off-line document in the printed-out form into a document in the form of image file and converting the document into an on-line document.

Also, it is preferable that said step (a) generates a barcode by converting all of the information included in the document into barcode information.

Also, it is preferable that said step (a) generates a barcode by converting the text information, image information or both of the information included in the document into barcode information.

Also, it is preferable that the barcode generated in said step (a) is a barcode selected from a group consisting of one-dimensional barcode, two-dimensional barcode, color barcode, continuous type barcode and discrete type barcode.

Also, it is preferable that watermark generated in said step (b) is invisible watermark.

Also, it is preferable that the method further comprises additionally inserting optical watermark that shows predetermined characters for indicating whether the document has been illegally copied when such act of illegal copying was committed.

Also, it is preferable that said step (c) combines the generated barcode and the watermark and combines by overlapping them.

Also, it is preferable that the watermark and barcode are combined in the form of the watermark including all of the barcode.

According to one aspect of the present invention, the present invention provides a method for authenticating the document by verifying the forgery or alteration of the document produced by the aforementioned document producing method, the authenticating method comprising (e) detecting the document so as to extract the barcode inserted in the document, and comparing the information which is included in the extracted barcode with the information which is included in the document; and (f) detecting the document so as to extract the watermark inserted in the document, and comparing the information which is included in the extracted watermark with the information which is included in the document.

In this regard, it is preferable that the method further comprises, before said step (e), (e') converting an off-line document in the printed-out form into a document in the form of image file and converting the document into an on-line document.

Also, it is preferable that the document is determined to be forged or altered when the information from any one of said step (e) and step (f) after being compared is different from each other.

Also, it is preferable that the document is determined to have its barcode itself replaced when the overlapped portion of the barcode and the watermark does not exist.

According to another aspect of the present invention, the present invention provides an apparatus for producing a document verifiable for its forgery or alteration, the apparatus comprising a barcode generation portion for generating the barcode based on the information which is included in an on-line document in the form of digital file; watermark generation portion for generating watermark based on the information which is included in the document; a combiner for combining the generated barcode and watermark; and an insertion portion for inserting the combined barcode and watermark into the document.

In this regard, it is preferable that the apparatus further comprises a document converting portion for converting an off-line document in the printed-out form into a document in the form of image file and converting the document into an on-line document.

According to still another aspect of the present invention, the present invention provides an apparatus for authenticating the document by verifying the forgery or alteration of the document produced using the aforementioned apparatus, the authenticating apparatus comprising a barcode detection and extraction portion for detecting the document so as to extract the barcode inserted in the document, and comparing the information which is included in the extracted barcode with the information which is included in the document; and a watermark detection and extraction portion for detecting the document so as to extract the watermark inserted in the document, and comparing the information which is included in the extracted watermark with the information which is included in the document.

In this regard, it is preferable that the apparatus further comprises a document converting portion for converting an off-line document in the printed-out form into a document in the form of image file and converting the document into an on-line document.

DETAILED DESCRIPTION OF A PREFERRED EMBODIMENT

Hereinbelow, the preferred embodiments of the present invention are described in details referring to the attached drawings.

The present invention generally includes two processes: a process for inserting watermark and barcode so as to produce document verifiable for its forgery or alteration, and a process for determining whether the document produced as above has been forged or altered so as to authenticate the document.

Figure 1:
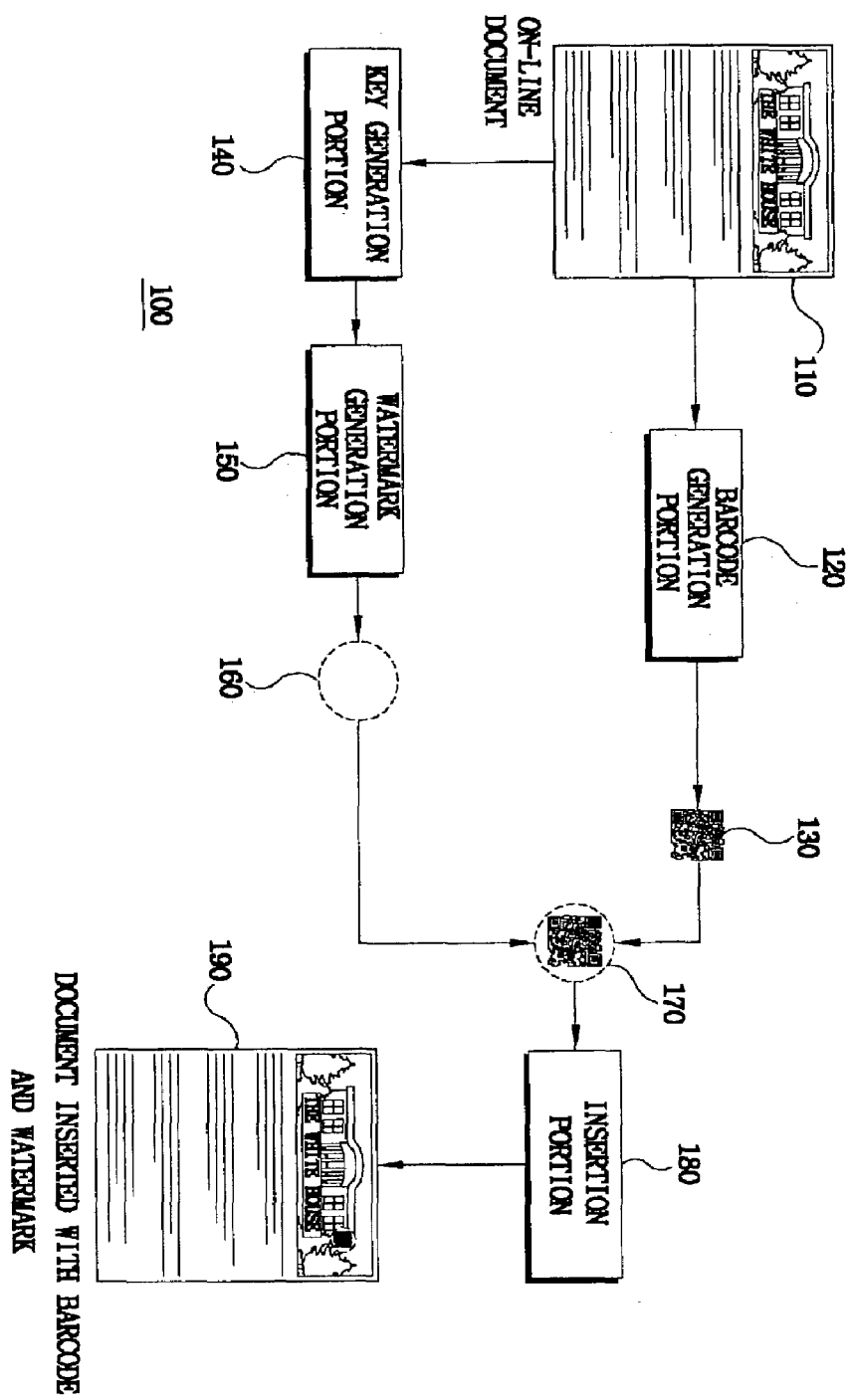
FIG. 1 is a block diagram showing the process of inserting barcode and watermark into an on-line document so as to produce a document verifiable for its forgery and alteration according to one embodiment of the present invention.
Figure 2:
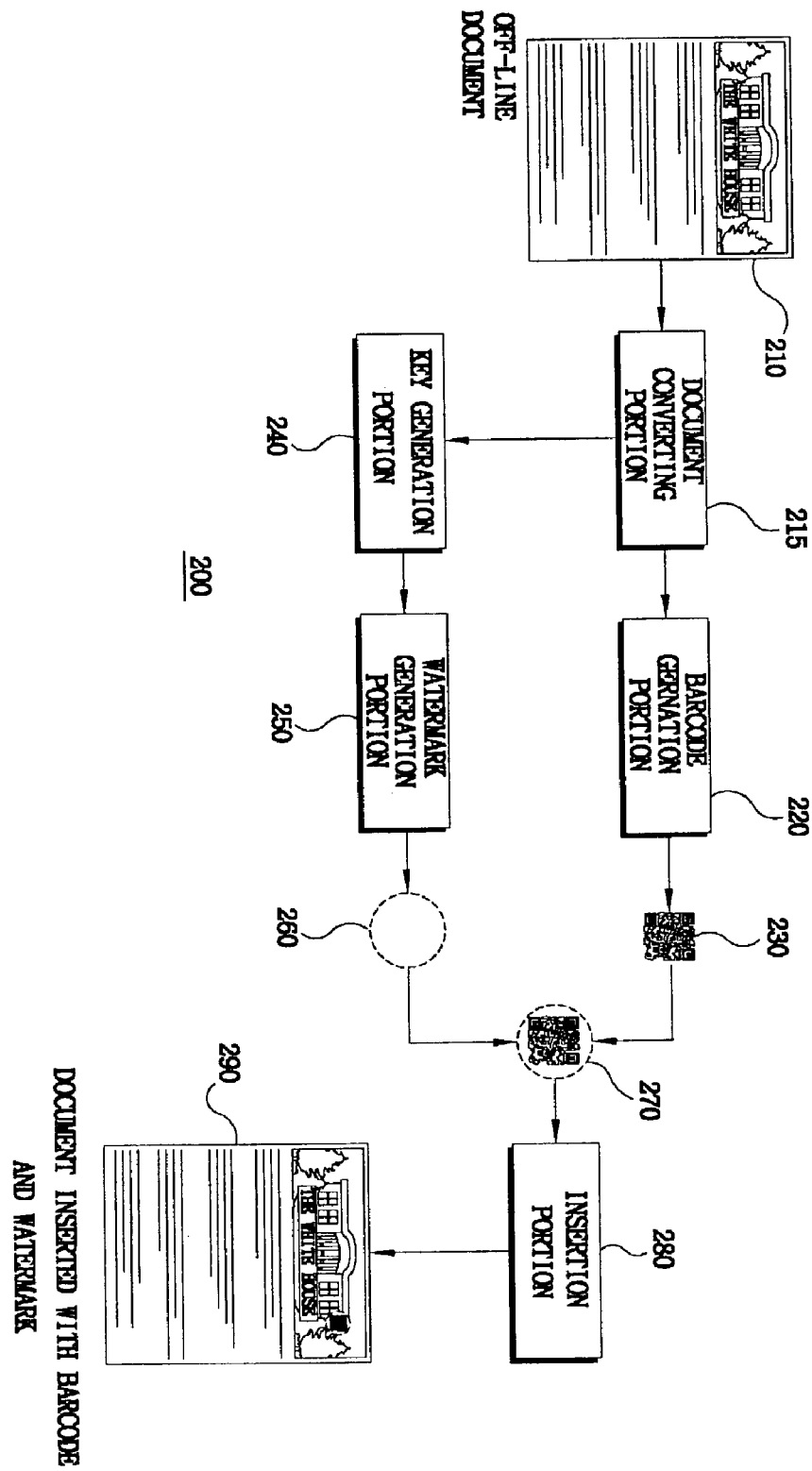
FIG. 2 is a block diagram showing a process of inserting barcode and watermark into an off-line document so as to produce a document verifiable for its forgery and alteration according to the other embodiment of the present invention.

At first, a process for producing such document is explained referring to FIGS. 1 & 2.

FIG. 1 is a block diagram showing the process of inserting barcode and watermark into an on-line document so as to produce a document verifiable for its forgery and alteration according to one embodiment of the present invention.

Referring to FIG. 1, an apparatus 100 for producing a document according to the present invention comprises a barcode generation portion 120 for generating the barcode based on the information of the document, a watermark generation portion 150 for generating watermark based on the information of the document, a combiner 170 for combining the generated barcode and watermark, and an insertion portion 180 for inserting the combined barcode and watermark into the document.

On-line document 110 is an electronic document in the form of digital file produced by the conventional software (for example, programs for word process such as Microsoft Word, etc. and programs for publication such as QUARKEXPRESS, etc.). Also, the on-line document 110 may be the document combining the document produced by the above conventional software and image files such as CAD, PHOTOSHOP, PDF files, etc. or the document of combined format of image and text.

At the barcode generation portion 120, a series of information is converted into barcode input format based on the information included in the on-line document 110, and barcode 130 in the form of image which can be inserted in the document is generated. Prior to converting the information included in the document into barcode format, it is useful to distinguish information of the document into image portion information and text portion information in order to even use information concerning positions of image and text portions in the document.

The barcode generated from the barcode generation portion 120 is encoded with number zero or special symbols by the combination of either thick or thin bar (black bar) and space (white bar) to be easily read in optics. This technique enables expression of information and collecting and decoding of information.

The black bars which represent characters or numbers and spaces are arranged specifically so as to indicating binary zero (0) and one (1). They are combined and used as information. They are made according to the rule defined by barcode language so called symbology. That is, barcode is a language comprised of bits of zero (0) and one (1). There are various kinds of code system according to the ratio of width of bar and space.

The barcode generated as aforementioned later uses reflection of light at barcode recognition device so as to reproduce data, and reproduced data is collected and transmitted. The barcode used in this process may be one-dimensional barcode, two-dimensional barcode, color code, continuous type or discrete type barcode and various types of barcode similar thereto, etc.

Also, a method generating barcode at the barcode generation portion 120 includes automatically converting the contents of the document into barcode information, or extracting only particular information from the document by user and to convert them so as to generate barcode.

Further, it is possible for said text portion used in said barcode generation to include a character sequence or text which was recognized by a character or text portion in the image portion through a process of character recognition. In addition, it is all possible for the barcode information generated in the barcode generation portion 120 to use the entire text, a part of text, information of the image, and partial or entire text information and image information of the on-line document 11 as barcode generating information.

In parallel with the barcode generation as above, the key generation portion 140 generates a watermark key based on information included in the on-line document 110. The generated key information could be the information for inserting and extracting watermark. Further, as for the information included in the document 110 which is a basis of generating a key, a mark of a public institution or company which produces a document, image information such as a company logo, a serial number allotted in a document, combination of numbers or characters or combination of date, image, numbers or characters selected at user's pleases are possible. The information of the document used in generating a barcode and the information of the document used in generating a watermark key may be identical one, but it is also possible that they are different ones.

The watermark generation portion 150 generates watermark 160 in the form of image to be inserted in the document using the watermark key information generated in the key generation portion 140. However, said watermark 160 is not limited to the form of image. The watermarking technology applicable to the present invention can be all the watermarking technology conventionally suggested or announced.

For instance, the watermarking technology disclosed in "Watermarking Method of Color Image using a Wavelet Transform and Discrete Cosine Transform (Korean Patent No. 285077)", "Text Watermark Embedding Method and Apparatus (Korean Patent Application No. 1999-58131)", "Technique for Preventing Document Tampering Using Fragile Watermark (Korean Patent Application No. 2000-1096)", and "Text Embedding Method and Apparatus for Issuance and Authentication of Digital Certificate (Korean Patent Application No. 2000-65038)" which have been filed in the same applicant as that of the present invention can be used in the process of generating and later detecting watermark of the present invention.

As the watermark 160 generated for verifying the forgery and alteration of the document, both of a visible watermark verifiable with the naked eye and invisible watermark not verifiable with the naked eye can be used. However, an invisible watermark is generally used.

Also, a robust watermark or fragile watermark, or a combination of robust watermark and fragile watermark are all possible for the kind of said watermark 160.

Further, an optical watermark can be generated and inserted into the document in addition to said watermark 160. The optical watermark is a watermark using optical interference, latent image exposure, or a similar optical phenomenon. In the case that a document with an optical watermark inserted is illegally copied, a character, for example, COPY, COPIED, FORGERY, etc. is appeared on the document, thereby determining whether the document is illegally copied. Such optical watermark is in detail disclosed in "Apparatus for Preventing Illegal Copy and Forgery/Alteration of a Document and Authenticating Apparatus (Korean Patent Application No. 2001-33568)" filed in the same applicant as that of the present invention.

Barcode 130 and watermark 160 each generated from the information included in the document 140 are modified to a combined form in the combiner 170. The combiner 170 combines the barcode 130 generated in the form of image and the watermark 160 generated in the form of image such that they are not damaged due to the mutual interference.

As for the combining method, the combining method of dividing the barcode 130 and watermark 160 in each separate location and of overlapping the barcode 130 and watermark 160 are both possible. However, in the case that the barcode 130 and watermark 160 are located in separate location, since it is difficult to detect the forgery/alteration of barcode itself, it is preferable to follow the combining method of overlapping the barcode 130 and watermark 160.

It is also preferable to insert a watermark larger than a barcode in order to verify whether the barcode itself is forged or altered in the combination of the barcode 130 and watermark 160. This is to authenticate the document by means of the remaining portion of the watermark in the case that a person with undesirable intention has altered the barcode itself.

Furthermore, in the case that an invisible watermark is used in combining the watermark 160 and the barcode 130, since the invisible watermark is not detected with the naked eye in its property and has scarcely mutual interference with the barcode, there is no damage in the barcode or watermark by the combination.

Next, the insertion portion 180 inserts the watermark 160 and barcode 130 combined in the combiner 170 into the document 110. As for the inserting method, it is both possible to insert the combined watermark and barcode into the image portion of the document 110, or insert them after converting the document 110 into an image file.

As such, insertion of the combined watermark 160 and barcode 130 in the document 110 at the insertion portion 180 results in producing the document 190 with a barcode and watermark inserted.

As for the document 190 produced through the above process, since information of document is included in barcode and is protected by the barcode, if the document is edited or corrected, it can verify change of the content, whereby the document 190 is prevented from its correction or editing and thus used on-line and offline safely. Besides, in the case that user replaces a barcode on purpose, the watermark portion overlapping the barcode is deleted and thus it is determined that the barcode itself was forged and altered in detecting a watermark.

Next, a process of producing a document by inserting a watermark and barcode into an off-line document is explained referring to FIG. 2. FIG. 2 is a block diagram showing a process of inserting barcode and watermark into an off-line document so as to produce a document verifiable for its forgery and alteration according to the other is embodiment of the present invention.

Since there are many cases that documents a company or government uses do not go through a digital process, it is common to digitalize an off-line document and convert it into an on-line document in order to use the document on-line. The off-line document 210 means the original copy of the document directly made off-line without through a computer, the document printed out via a printer after being made on-line, or the document with additional information such as signature or sealing inserted as user demands after being printed out.

The document producing apparatus 200 in FIG. 2 further comprises the document converting portion 215 in which the off-line document 210 is converted into a document in the form of image by an optical processing apparatus including a scanner and then converted into an on-line document.

Further, the document converting portion 215 may additionally carry out a process of converting partial or entire text of the electronic file into a document in the form of text by the OCR program through OCR (Optical Characteristic Recognition) apparatus or optical processing apparatus.

During the process of converting the off-line document 210 into a document in the form of image file at the document converting portion 215, it is possible to use the image information of a character, picture or drawing as a part of the barcode inserting information.

The barcode 230 generated at the barcode generation portion 220 and the watermark 260 generated at the key generation portion 240 and watermark generation portion 250 are combined at the combining portion 270, and the combined watermark and barcode is inserted in the document 210 at the insertion portion 280, consequently the document 290 with barcode and watermark inserted is produced. Such series of process is the same as the part corresponding to the embodiment producing the document by inserting barcode and watermark into the on-line electronic document which is explained referring to FIG. 1 and thus the detailed explanation thereof is left out.

Figure 3:
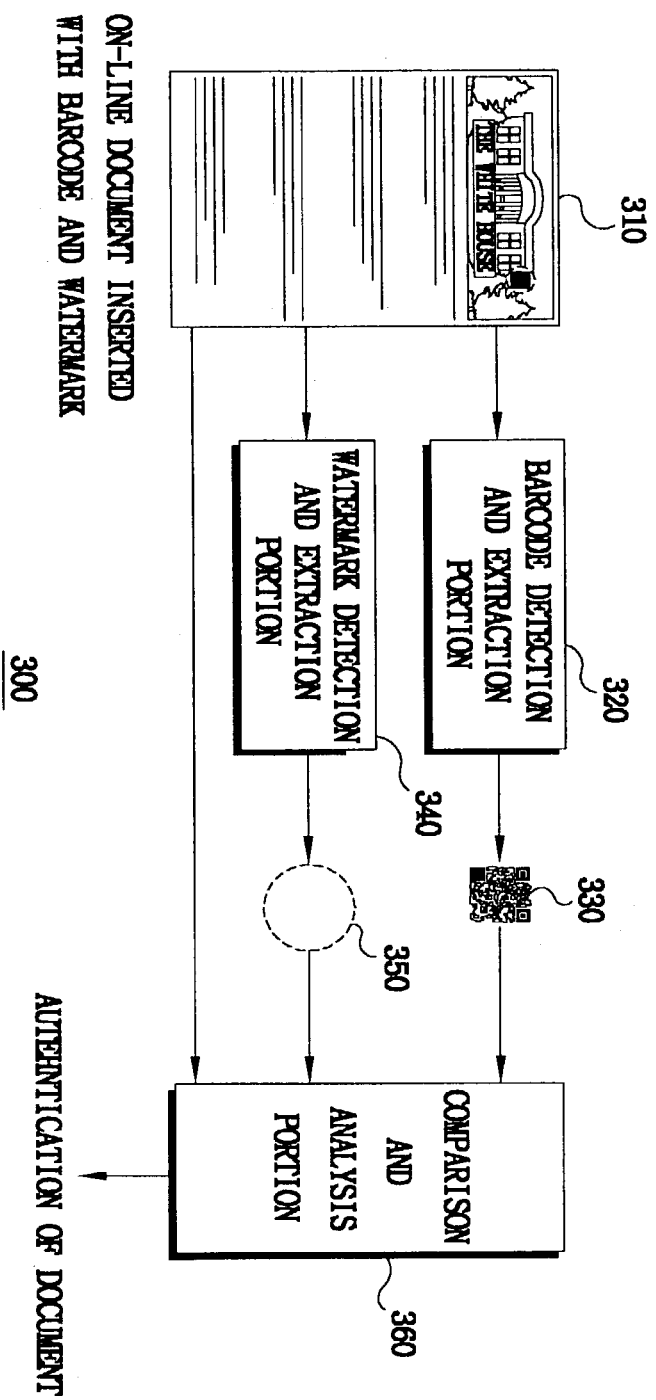
FIG. 3 is a block diagram showing a process of authenticating an on-line document inserted with barcode and watermark according to one embodiment of the present invention.
Figure 4:
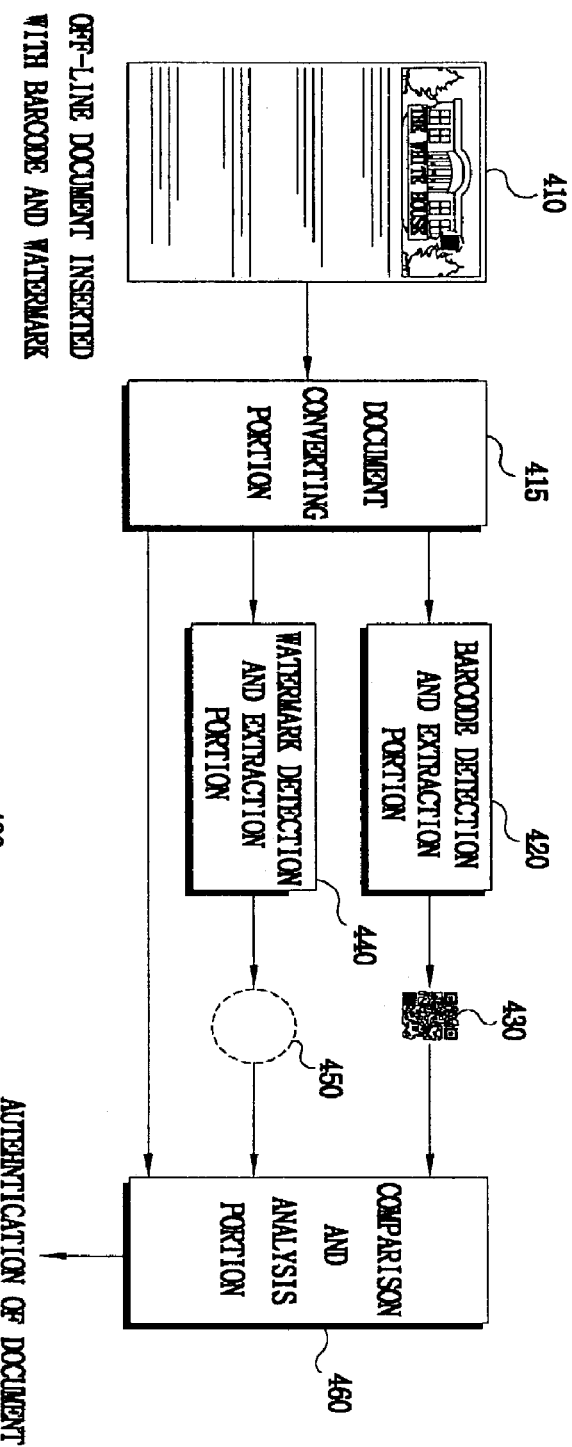
FIG. 4 is a block diagram showing a process of authenticating an off-line document inserted with barcode and watermark according to the other embodiment of the present invention.

Next, a process of verifying whether the document produced through the document producing process of FIGS. 1 & 2 is forged or altered and authenticating the document is explained referring to FIGS. 3 & 4.

FIG. 3 is a block diagram showing a process of authenticating an on-line document inserted with barcode and watermark according to one embodiment of the present invention.

Referring to FIG. 3, the apparatus (300) authenticating the on-line document according to one embodiment of the present invention comprises a barcode detection and extraction portion 320, watermark detection and extraction portion 340, and a comparison and analysis portion 360 comparing the extracted information with the information included in the document 310.

The on-line document 310 with barcode and watermark inserted indicates a document in the case that a document produced through the document producing process of FIG. 1 or FIG. 2 is distributed on-line.

The barcode detection and extraction portion 320 detects the information of the barcode part in the document 310 through the OCR process and extracts information of the barcode. The comparison and analysis portion 360 compares the information included in the extracted barcode 330 with the information included in the document 310 and authenticates whether the document 310 is forged or altered. That is, if the content of the document 310 is forged or altered during the distribution of the document 310, information of the forged or altered content of the document 310 and information included in the extracted barcode 330 become differentiated from each other and thus it is possible to determine that the document 310 is forged or altered.

The watermark detection and extraction portion 340 detects the watermarked part including (surrounding) the barcode in the document 310 and also extracts the watermark. The comparison and analysis portion 360 compares information included in the extracted watermark 350 with information included in the document 310 and authenticates whether the document 310 is forged or altered. That is, if the content of the document 310 is forged or altered during the distribution of the document 310, information of the forged or altered content of the document 310 and information included in the extracted watermark 350 become differentiated from each other and thus it is possible to determine that the document 310 is forged or altered. Also, if the barcode itself is replaced or altered, since the overlapped watermark is also altered, the information included in the document 310 is differentiated from the information included in the extracted watermark 350 and thus it is possible to determine that the barcode is forged or altered.

Furthermore, the forgery or alteration such as replacement of barcode itself is also verifiable by verifying that a part of the watermark is cut away, which is possible because the barcode and watermark are overlapped and combined in the document producing process aforementioned.

It is not limited to which process should be preceded in the process of the barcode detecting/extracting and comparing/analyzing and of the watermark detecting/extracting and comparing/analyzing. The process relating to the watermark after process relating to the barcode can be performed, and the two processes also can be performed in a reverse order or simultaneously.

Next, a process of authenticating whether an off-line document with watermark and barcode inserted is forged or altered is explained referring to FIG. 4. FIG. 4 is a block diagram showing a process of authenticating an off-line document inserted with barcode and watermark according to the other embodiment of the present invention.

The off-line document 410 with barcode and watermark inserted means a document that the document 190 & 290 with barcode and watermark inserted produced in the document producing process of FIGS. 1 & 2 is printed out via a printer.

The document authenticating apparatus 400 of FIG. 4 further comprises the document converting portion 415 wherein the off-line document 410 is converted into a document in the form of image file through an optical processing apparatus including a scanner and then converted into the on-line document.

A series of process for authenticating whether the document is forged or altered which is performed at the barcode detection and extraction portion 420, watermark detection and extraction portion 440, and the comparison and analysis portion 460 is the same process as the part corresponding to the embodiment authenticating the on-line document with barcode and watermark inserted which is explained referring to FIG. 3 and thus the detailed explanation thereof is left out.

Meanwhile, the barcode detection and extraction portion 420 may include a barcode recognizing apparatus. In this regard, the barcode recognizing apparatus is called a barcode reader, an apparatus for converting a barcode symbol optically expressed into a digital data adapted to the computer.

As for the barcode recognizing apparatus, it is all possible to use a method of employing LED, He—Ne Laser, Laser Diode according to the kind of light source, a method of employing a fixed beam wherein beam from the above light source scans the barcode symbol once or employing a movable beam wherein beam from the above light source scans the barcode symbol repeatedly, and a method of recognizing in a state of the barcode recognizing apparatus contacting with an object for analysis or symbol, or a method of recognizing in a state of the barcode recognizing apparatus not contacting with an object for analysis or symbol.

The data decoded in the barcode reader is directly transmitted to the comparison and analysis portion 460, or is temporarily stored in a buffer within the reader and then transmitted to the comparison and analysis portion 460 at a time, or can be utilized by an application program within the reader.

It will be appreciated that many other variations and modifications may be made to the specific embodiment described above without departing from the scope of the invention.

What is claimed is:

1. A method for producing a document verifiable for its forgery or alteration, the method comprising:
   (a) generating a barcode based on the information which is included in an online document in the form of digital file;
   (b) generating watermark based on the information which is included in the document;
   (c) combining the generated barcode and watermark by overlapping the barcode and watermark, in the form of the watermark including all of the barcode; and
   (d) inserting the combined barcode and watermark into the document,
   wherein the watermark is larger than the barcode.

2. The method as claimed in claim 1, wherein the method further comprises, before said step (a),
   (a') converting an off-line document in the printed-out form into a document in the form of image file and converting the document into an on-line document.

3. The method as claimed in claim 1, wherein said step (a) generates the barcode by converting all of the information included in the document into barcode information.

4. The method as claimed in claim 1, wherein said step (a) generates a barcode by converting the text information, image information or both of the information included in the document into barcode information.

5. The method as claimed in claim 1, wherein the barcode generated in said step (a) is a barcode selected from a group consisting of one-dimensional barcode, two-dimensional barcode, color barcode, continuous type barcode and discrete type barcode.

6. The method as claimed in claim 1, wherein watermark generated in said step (b) is invisible watermark.

7. The method as claimed in claim 1, wherein the method further comprises additionally inserting optical watermark that shows predetermined characters for indicating whether the document has been illegally photocopied when such act of illegal photocopying was committed.

8. A method for authenticating the document by verifying the forgery or alteration of the document produced by the method of claim 1, the method comprising:
   (e) detecting the document so as to extract the barcode inserted in the document, and comparing the information which is included in the extracted barcode with the information which is included in the document; and
   (f) detecting the document so as to extract the watermark inserted in the document, and comparing the information which is included in the extracted watermark with the information which is included in the document.

9. The method as claimed in claim 8, wherein the method further comprises, before said step (e), (e') converting an off-line document in the printed-out form into a document in the form of image file and converting the document into an on-line document.

10. The method as claimed in claim 8, wherein the document is determined to be forged or altered when the information from any one of said step (e) and step (f) after being compared is different from each other.

11. The method as claimed in claim 8, wherein the document is determined to have its barcode itself replaced when the overlapped portion of the barcode and the watermark does not exist.

12. An apparatus for producing a document verifiable for its forgery or alteration, the apparatus comprising:
   a barcode generation portion for generating the barcode based on the information which is included in an on-line document in the form of digital file;
   watermark generation portion for generating watermark based on the information which is included in the document;
   a combiner for combining the generated barcode and watermark by overlapping the barcode and watermark; and
   an insertion portion for inserting the combined barcode and watermark into the document,
   wherein the watermark is larger than the barcode.

13. The apparatus as claimed in claim 12, wherein the apparatus further comprises a document converting portion for converting an off-line document in the printed-out form into a document in the form of image file and converting the document into an online document.

14. An apparatus for authenticating the document by verifying the forgery or alteration of the document produced using the apparatus of claim 12, the apparatus comprising:
   a barcode detection and extraction portion for detecting the document so as to extract the barcode inserted in the document, and comparing the information which is included in the extracted barcode with the information which is included in the document; and a watermark detection and extraction portion for detecting the document so as to extract the watermark inserted in the document, and comparing the information which is included in the extracted watermark with the information which is included in the document.

15. The apparatus as claimed in claim 14, wherein the apparatus further comprises a document converting portion for converting an off-line document in the printed-out form into a document in the form of image file and converting the document into an online document.

* * * * *